(12) United States Patent
Chen et al.

(10) Patent No.: US 8,805,843 B2
(45) Date of Patent: Aug. 12, 2014

(54) INFORMATION MINING USING DOMAIN SPECIFIC CONCEPTUAL STRUCTURES

(75) Inventors: Ying Chen, San Jose, CA (US); Jeffrey Thomas Kreulen, San Jose, CA (US); James J. Rhodes, Los Gatos, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 12/132,515

(22) Filed: Jun. 3, 2008

(65) Prior Publication Data
US 2008/0243889 A1 Oct. 2, 2008

Related U.S. Application Data

(63) Continuation of application No. 11/674,601, filed on Feb. 13, 2007, now abandoned.

(51) Int. Cl.
G06F 17/30 (2006.01)
G06F 7/00 (2006.01)

(52) U.S. Cl.
CPC ................ *G06F 17/3071* (2013.01); *G06F 17/30713* (2013.01)
USPC .......... 707/738; 707/708; 707/710; 707/731; 707/749

(58) Field of Classification Search
None
See application file for complete search history.

(56) References Cited

U.S. PATENT DOCUMENTS

| | | | |
|---|---|---|---|
| 6,397,205 B1 | 5/2002 | Juola | |
| 6,424,971 B1 | 7/2002 | Kreulen et al. | |
| 6,442,545 B1 * | 8/2002 | Feldman et al. | 1/1 |
| 7,117,207 B1 | 10/2006 | Kerschberg et al. | |
| 7,139,754 B2 | 11/2006 | Goutte et al. | |
| 7,475,018 B1 | 1/2009 | DeTore et al. | |
| 7,668,789 B1 * | 2/2010 | Forman et al. | 706/20 |
| 2001/0037324 A1 | 11/2001 | Agrawal et al. | |
| 2003/0084066 A1 | 5/2003 | Waterman et al. | |
| 2003/0191780 A1 | 10/2003 | Heger et al. | |
| 2004/0158559 A1 | 8/2004 | Poltorak et al. | |
| 2004/0258220 A1 | 12/2004 | Levine et al. | |
| 2005/0010580 A1 | 1/2005 | Lancefield | |
| 2005/0022106 A1 * | 1/2005 | Kawai et al. | 715/500 |
| 2005/0171948 A1 * | 8/2005 | Knight | 707/6 |
| 2006/0053098 A1 * | 3/2006 | Gardner et al. | 707/3 |

(Continued)

OTHER PUBLICATIONS

Latifur R. Khan, "Ontology-based Information Selection", A Dissertation Presented to the Faculty of the Graduate School, University of Southern California in Partial Fulfillment of the Requirements for the Degree Doctor of Philosophy, Computer Science, Aug. 2000.

(Continued)

*Primary Examiner* — Sangwoo Ahn
(74) *Attorney, Agent, or Firm* — Shimokaji & Associates, P.C.

(57) ABSTRACT

A method and analytics tools for information mining incorporating domain specific knowledge and conceptual structures are disclosed, the method including: providing a first set of documents related to a first topic of interest; using a first taxonomy to categorize the first set of documents into a set of categories; providing a second set of documents related to a second topic of interest; categorizing the second set of documents according to the set of categories of the first set of documents; using an element of domain knowledge to re-categorize the first set of documents; and examining a category to identify a document of interest.

14 Claims, 5 Drawing Sheets

(56) References Cited

U.S. PATENT DOCUMENTS

2006/0242190 A1* 10/2006 Wnek .......................... 707/102
2007/0255731 A1 11/2007 Maze
2007/0294200 A1 12/2007 Au

OTHER PUBLICATIONS

Ramussen, E, "Clustering Algorithms," in Frakes, W.B. and Baeza-Yates, R., editors, Information Retrieval, Data Structures and Algorithms, pp. 419-442, 1992, Pretence Hall, Englewood Cliffs, New Jersey.

Press, et al., "Numerical Recipes in C, Second Edition," pp. 620-623, 1992, New York, Cambridge University Press.

IBM, "Technique for Screening for Infringement of Patents," IBM Technical Disclosure Bulletin, pp. 4940-4942, US, Apr. 1986, vol. 28, No. 11.

Shih-Hung Wu et ai, "Text Categorization Using Automaticailly Acquired Domain Ontology", Annual Meeting of the ACL, Proceedings of the sixth international workshop on Information retrieval with Asian Languages. pp. 138-145, 2003.

Grigoris Antoniou et ai, "On the Refinement of Ontologies", Internatinal Journal of Intelligent Systems, 2000.

Sonja Zillner et ai, "Ontology-based Query Refinement for Multimedia Meta Objects", In Proc, of the Sixth International Conference on Information Integration and Web Based Applications & Services, 2004.

Jianjiang Lu et ai, "Refining multiple ontologies: A mapping-based approach", Department of Computer Science and W Engineering, Southeast University, Nanjing, China, 2005.

Shih-Hung Wu et ai, "Text Categorization Using Automaticailly Acquired Domain Ontology", Annual Meeting of the ACL, Proceedings of the sixth international workshop on Information retrieval with Asian Languages. Pages 138-145, 2003.

Notice of Allowance from U.S. Appl. No. 11/674,601 dated Sep. 25, 2009.

* cited by examiner

200

"investigate" phase includes: ⟵ 201

A) using a search tool to extract a document set containing information related to a given topic from an information data warehouse;

B) replacing each document in the extracted document set with a numeric vector that corresponds to its dictionary term occurrences, the dictionary being generated based on frequency of words, phrases, annotations and structured features within each document in the extracted document set, compared to the corpus as a whole;

C) systematically comparing the numeric vectors in various ways to determine the similarity of any two documents to each other.

"Comprehend" phase includes: ⟵ 202

A) using a document classification technology to generate naturally occurring categories from the extracted documents and to classify selected documents into appropriate categories, using the numeric vector space and the feature space created for the selected document set;

B) using an interactive clustering of the feature space that helps a domain expert refine the categorization if desired;

"Examine" phase includes: ⟵ 203

A) using a contingency method to compare two taxonomies, or to compare a taxonomy against a feature or structured information;

B) using the contingency method to make a detailed category-by-category comparison between two different document sets or two different domain specific conceptual frameworks.

FIG.2

|    | Class Name | Size | |
|----|------------|------|---|
| 33 | California recall election | 28 (0.08%) | |
| 28 | Oscars | 207 (0.61%) | |
| 35 | California Board | 328 (0.96%) | |
| 31 | owners | 222 (0.65%) | |
| 22 | taxes | 1078 (3.15%) | |
| 29 | meetups | 257 (0.75%) | |
| 32 | suv | 341 (1.00%) | |
| 26 | fuel_economy | 691 (2.02%) | |
| 38 | auto_show | 283 (0.83%) | |
| 16 | hybrid models | 947 (2.77%) | |
| 6 | purchase decision | 803 (2.35%) | |
| 27 | alternative fuel | 620 (1.81%) | |
| 19 | sales | 3022 (8.84%) | |
| 12 | hybrid car features | 463 (1.35%) | |
| 18 | future plans | 282 (0.82%) | |
| 39 | surveys | 187 (0.55%) | |
| 34 | parts | 188 (0.55%) | |
| 2 | clubs | 263 (0.77%) | |
| 7 | consumer product info | 375 (1.10%) | |
| 8 | cost | 671 (1.96%) | |
| 1 | applications | 78 (0.23%) | |
| 4 | build it yourself | 409 (1.20%) | |
| 30 | miles per gallon | 843 (2.46%) | |
| 25 | fuel cell | 1600 (4.68%) | |
| 13 | hybrid car forums | 192 (0.56%) | |
| 21 | studies | 164 (0.48%) | |
| 40 | Miscellaneous | 2419 (7.07%) | |
| 17 | performance | 172 (0.50%) | |
| 24 | technology | 2124 (6.21%) | |
| 10 | emissions | 1485 (4.34%) | |
| 20 | power sources | 1536 (4.49%) | |
| 11 | engine | 2811 (8.22%) | |
| 14 | fuel related issues | 511 (1.49%) | |
| 23 | vehicle competitions | 312 (0.91%) | |
| 9 | electric vehicle | 3593 (10.51%) | |
| 36 | research and development | 2563 (7.49%) | |
| 15 | hot new cars | 41 (0.12%) | |
| 5 | buses | 797 (2.33%) | |
| 41 | complaints | 9 (0.03%) | |
| 37 | series | 424 (1.24%) | |
| 3 | battery | 862 (2.52%) | |
| | TOTAL/AVERAGE | 34201 | |

FIG.4

INFORMATION MINING USING DOMAIN SPECIFIC CONCEPTUAL STRUCTURES

BACKGROUND OF THE INVENTION

The present invention relates generally to the field of information analytics tools and methods in data mining and, more particularly, to eliciting and capturing domain knowledge as part of the data mining process.

Using text and information mining to find insights in volumes of data is non-trivial. Often endless "googling" (referring to use of the well-known search engine for searching the web) is done to search various kinds of information which might lead to insights. However, such googling is labor-intensive and time-consuming. Furthermore, to make sense of the search results may require significant manual processing. Even so, the results may not be valuable.

Better methodologies and tools are needed to help identify insights in the information.

SUMMARY OF THE INVENTION

In one embodiment of the present invention, a method, for use with 1) a first set of documents related to a first topic of interest and 2) a second set of documents related to a second topic of interest, comprises the steps of: using a first taxonomy to categorize the first set of documents into a set of categories; categorizing the second set of documents according to the set of categories of the first set of documents; and examining a category to identify a document of interest, the document of interest being a representative document within the category.

In another embodiment of the present invention, a method, for use with a set of documents related to a first topic of interest, comprises: creating a first set of categories of the set of documents according to an automatically generated taxonomy; creating a second set of categories of the set of documents according to at least one of unstructured data, structured data, and annotations derived from text in the set of documents; constructing a contingency table having the first set of categories along a first axis and the second set of categories along a second axis; and identifying a relationship between at least two different categories using the contingency table.

In yet another embodiment of the present invention, a method comprises: extracting a set of documents related to a specified topic from a data warehouse; generating a taxonomy for the set of documents that provides a first partition of the set of documents according to the taxonomy; using domain-specific knowledge to re-partition the set of documents to provide a second partition of the set of documents; and creating a refined taxonomy for the set of documents according to the second partition so that the refined taxonomy incorporates the domain-specific knowledge.

In still another embodiment of the present invention, a computer program product, for use with 1) a first set of documents related to a first topic of interest and 2) a second set of documents related to a second topic of interest, comprises a computer useable medium including a computer readable program, wherein the computer readable program when executed on a computer causes the computer to: categorize the first set of documents into a set of categories using a first taxonomy; categorize the second set of documents according to the set of categories of the first set of documents; and examine a category to identify a document of interest, wherein the document of interest typifies the category by most nearly matching a mathematical definition of the category.

In a further embodiment of the present invention, a computer program product comprises a computer useable medium including a computer readable program, wherein the computer readable program when executed on a computer causes the computer to: extract a set of documents related to a specified topic from a data warehouse; generate a taxonomy for the set of documents that provides a first partition of the set of documents according to the taxonomy; use domain-specific knowledge to re-partition the set of documents to provide a second partition of the set of documents; and create a refined taxonomy for the set of documents according to the second partition so that the refined taxonomy incorporates the domain-specific knowledge.

These and other features, aspects, and advantages of the present invention will become better understood with reference to the following drawings, description, and claims.

BRIEF DESCRIPTION OF THE DRAWINGS

FIG. 2 is flowchart illustrating phases of a methodology for information mining using domain specific conceptual structures in accordance with an embodiment of the present invention;

FIG. 4 is an illustration of a graphical user interface for taxonomy generation in the method of FIG. 3.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention provide systems and methods of information mining using domain specific conceptual structures. Embodiments of the present invention provide analytics tools, and methodologies involving those tools, for assisting in finding insights in information by eliciting and capturing domain knowledge as part of the mining process. Embodiments may be used, for example, by businesses for patent portfolio analysis, competitor analysis and white space identification, finding potential licensee markets, identification of experts, and finding potential partnering opportunities.

By enabling the use of user domain-specific knowledge to filter information and efficiently and effectively narrow search results, embodiments of the present invention differ from prior art search techniques that do not have a capability to employ such domain-specific knowledge. For example, one embodiment of the present invention goes beyond typical prior art keyword search to find deeper level relationships between collections of documents and to discover important emerging trends and correlations that would otherwise remain hidden. The present invention's incorporation of domain knowledge to capture critical concepts at each stage and to make these domain concepts the focus of the analysis work product stands in contrast to the absence of such in prior art standard text mining techniques.

Figure 1:
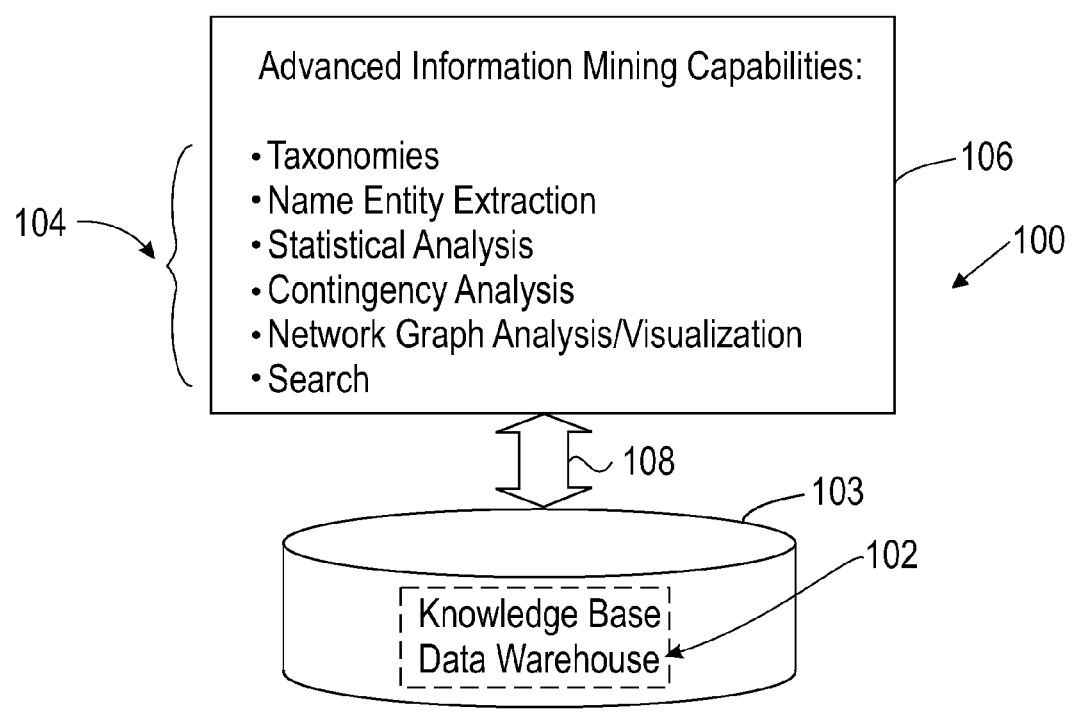
FIG. 1 is a system block diagram illustrating a system for information mining using domain specific conceptual structures in accordance with an embodiment of the present invention.

FIG. 1 illustrates information retrieval system 100 in accordance with one embodiment of the present invention. To address the major issues in the information mining process, information retrieval system 100 may utilize a set of analytics tools to allow the use of domain knowledge in the location of information. The analytics tool set may contain a knowledge base data warehouse 102 and a set of analytics tools 104, for identifying information about a specific topic of interest to a user of system 100 (e.g., a topic such as expertise for a group of people) as shown in FIG. 1. The data warehouse 102 may be implemented using computer-readable storage devices 103. Computer-readable storage devices 103 may communicate with a computer system 106 via a network, electronic, or other communication path 108. Computer system 106 may provide an interface for a human user to access data warehouse 102 and may be used to implement and provide a human user interface for analytics tools 104. Data warehouse 102 may contain documents that include, for example, people information as well as other kinds of information that are helpful in analysis. For the example topic of expertise for a group of people, the information could include structured fields on people's titles and ranks. The analytics tools 104 may provide functions including, for example, exploring the data warehouse 102 and analyzing various relationships among documents and people. As indicated in FIG. 1, analytics tools 104 may include capabilities for providing an end user with, for example, taxonomies, name entity extraction, statistical analyses, contingency analyses, and network graph analysis and visualization.

Referring now to FIG. 2, a method 200 of one embodiment of the present invention may comprise an investigate phase 201 of processes, a comprehend phase 202 of processes, and an examine phase 203 of processes.

The investigate phase 201 may use a search tool, e.g., from the set of analytics tools 104, to extract a set of documents containing information related to a given topic in a specific domain of interest from a data warehouse, e.g., data warehouse 102. Exploration of the data warehouse using the search tool may use structured features, annotations, and unstructured text indexes in combination to select the relevant information for the topic of interest.

Then an analytics tool—e.g., from the set of analytics tools 104 and described in more detail below—may convert each document in the extracted document set with a numeric vector that corresponds to the document's dictionary term occurrences (e.g., using the document's word, feature, and structured information content) where the dictionary may be generated based on the frequency of words, phrases, annotations and structured features within each document in the extracted document set, compared to the corpus as a whole. The dictionary may be refined by a user of system 100, if desired.

These numeric vectors can then be systematically compared in various ways to determine the similarity of any two documents in the extracted document set to each other. Furthermore, other documents outside the initial extracted document set may be compared with the initial extracted document set via the derived dimensions of the initial extracted document set to determine similarity of the other documents to the initial extracted document set as a whole, or to individual documents within the initial extracted document set.

The comprehend phase 202 may use a document classification technology (also called a "taxonomy generation technology")—e.g., from the set of analytics tools 104 and described in more detail below—to generate naturally occurring categories from the documents of the extracted document set and to classify a set of selected documents from the extracted document set into appropriate categories. Such a taxonomy generation technology may use the numeric vector space and the feature space created for the selected document set. Furthermore, the taxonomy generation technology may use an interactive clustering of the feature space that can help a domain expert (e.g., a user of system 100) refine the categorization if desired.

The examine phase 203 may use a contingency table analysis—e.g., from the set of analytics tools 104 and described in more detail below—that compares two taxonomies, or compares a taxonomy against a feature or structured information, such as comparing one taxonomy against a feature over time, or comparing the taxonomy against, e.g., people's titles and ranks (i.e., structured information). The contingency table analysis tool may also enable a detailed category-by-category comparison between two different document sets or two different domain specific conceptual frameworks. Furthermore, a trending tool—e.g., from the set of analytics tools 104 and described in more detail below—that overlays temporal document information on top of document categories may be used to examine the recentness of various aspects of the document information.

Figure 3:
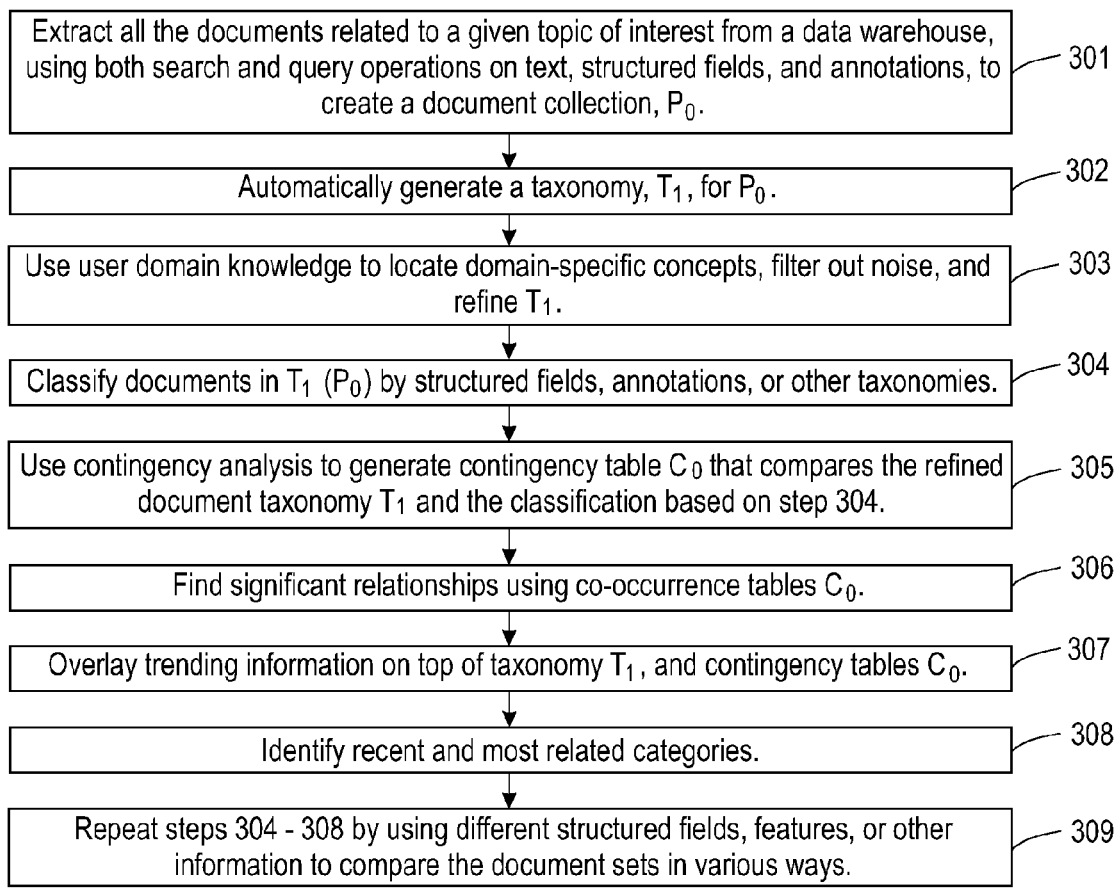
FIG. 3 is a flowchart illustrating a method of information mining using domain specific conceptual structures in accordance with an embodiment of the present invention.

Referring now to FIG. 3, a method 300 of one embodiment of the present invention may begin with a process 301 of taking a given topic of interest and extracting a set of documents $P_0$ related to the given topic of interest from the data warehouse 102. For example, computer system 106 may be used to extract a set of documents $P_0$ relevant to the topic of interest from a knowledge base (in data warehouse 102) on the given topic using both search operations and query operations, for example, on text, structured fields, and annotations. The topic of interest-related documents $P_0$ may be extracted from the data warehouse 102 using an analytics tool from the set of analytics tools 104. The analytics tool may automatically convert the extracted documents $P_0$ into a numeric vector through words, phrase, and bag of words analysis. For example, computer system 106 through the set of analytics tools 104 may use a method such as that described by U.S. Pat. No. 6,424,971. Such a numeric vector, together with structured information from the documents $P_0$ may then be used for subsequent analysis. It may also be possible that a user of system 100 would only know about one set of initial extracted documents for one or several specific topics so that, as far as the user were concerned, process 301 could be skipped (having been already effectively completed for that user).

Continuing with method 300 at process 302, computer system 106 may be used to automatically generate a taxonomy, $T_1$, for the extracted document set $P_0$ using words, bag of words, phrases analysis, and structured and unstructured features.

FIG. 4 shows an example of a generated taxonomy 400 for a document set $P_0$, which illustrates the following example. In the example, given a document repository of web pages of companies that includes structured (e.g., dates and URL (uniform resource locater)) and unstructured fields (e.g., web page text), it may be desired to create an analysis of what topics are being discussed and in relation to what companies. To do so, method 300 may (e.g., at process 301) extract a set of relevant documents $P_0$ from the knowledge base (contained, e.g., in data warehouse 102) on a given topic using a query of some kind. For instance, a user of system 100 may be interested in discovering public perception of hybrid electric vehicles. Process 301 may extract the documents $P_0$ related to hybrid electric vehicles from the data warehouse 102. Then (e.g., at process 302) the set of analytics tools 104 may automatically convert the extracted documents $P_0$ into a numeric vector through words, phrase, and bag of words analysis, using a method such as that described in U.S. Pat. No. 6,424, 971, referenced above. Such a numeric vector, together with structured information may then be used for subsequent analysis. As above, it may also be possible that end users of system 100 only know about one set of extracted documents on specific topics, which can be taken as the document set $P_0$ so that, as far as such end users were concerned, processes 301 and 302 could be skipped (having been already effectively completed for those users). Using the set of analytics tools 104, users of system 100 can also find the "nearest neighbor"-documents, i.e., the documents $P_1$ most nearly related to $P_0$. Then a combined set of all the documents from both $P_0$ and $P_1$, denoted $P_0+P_1$, may need to be examined next.

For example, a taxonomy based on the extracted document set $P_0$ can be generated using a method such as that described in U.S. Pat. No. 6,424,971, referenced above. Computer system 106 may be used to automatically classify the document set $P_0$ using automatic taxonomy generation techniques that treat the documents as words, generating a feature space for the document set $P_0$ and using clustering technologies such as K-means and other clustering methods to cluster the documents, as disclosed, for example, by Rasmussen, E., "Clustering Algorithms", in Frakes, W. B. and Baeza-Yates, R., editors, Information Retrieval, Data Structures and Algorithms, pages 419-442, Prentice Hall, Englewood Cliffs, N.J. (1992). Once the clusters are generated, additional refinements can be made by merging, deleting, or adding classes. The taxonomy may also be used to partition the document set $P_0$, i.e., to divide the document set $P_0$ up into non-overlapping classes.

FIG. 4 shows an example of a generated taxonomy 400 for the document set of web pages of companies example given above. Column 401 provides a list of categories (also referred to as "class names" or classifications); column 402 provides, for example, the number of documents of $P_0$ in each category and the percentage the category represents out of the total number of documents of the set $P_0$; and column 403 presents temporal trending information in a graphical format that may show, for example, the relative volume of documents published in each category as a function of time over some predetermined time-span.

At process 303, method 300 may continue by using specific user domain knowledge to locate domain specific concepts, filter out noise and refine the taxonomy $T_1$. In the example illustrated, such user domain knowledge may comprise, for example, some specialized knowledge about hybrid electric vehicles, whether technical, marketing, or regulatory in nature.

Figure 5:
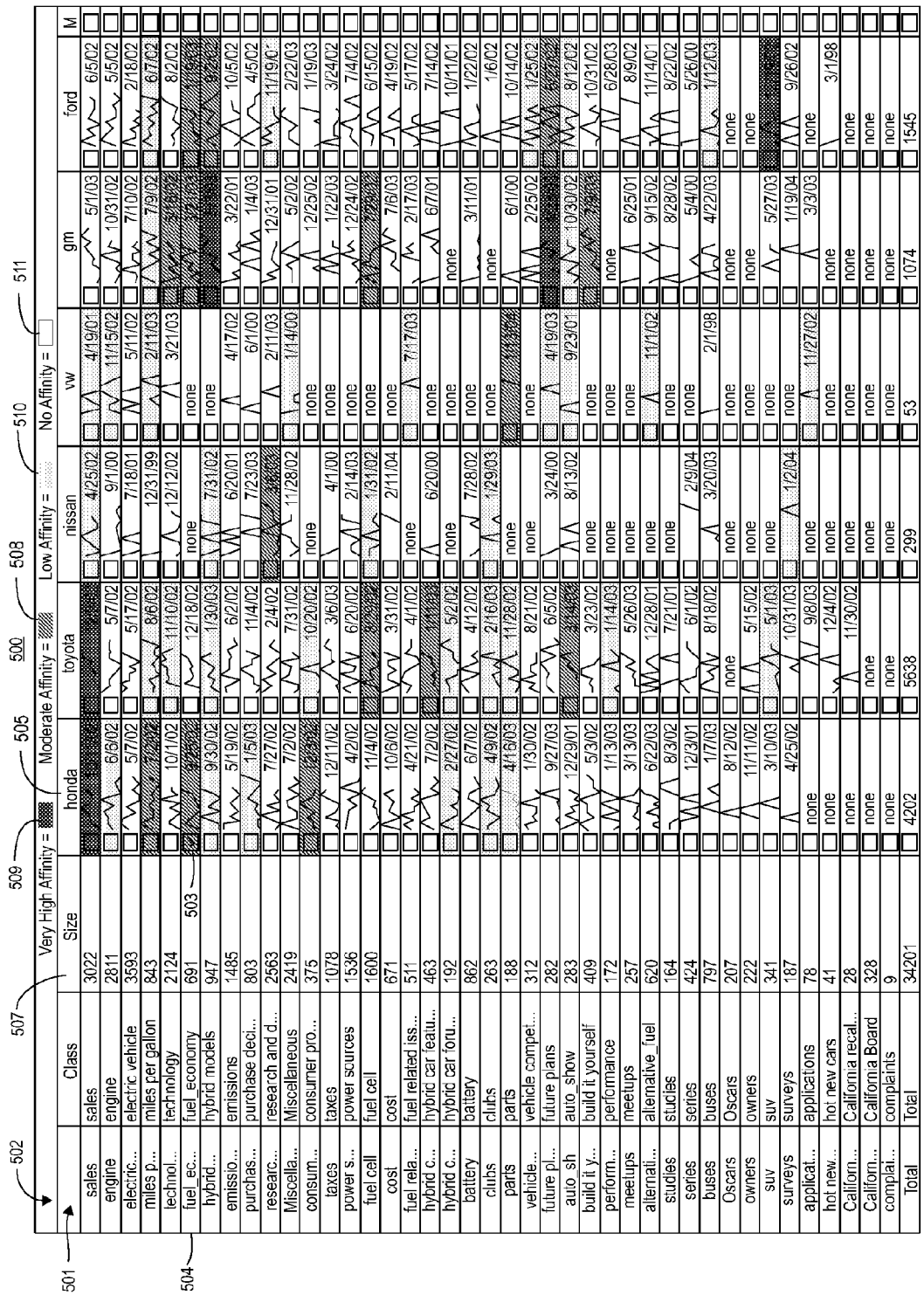
FIG. 5 is an illustration of a contingency table for a process of the method of FIG. 3.

At process 304, method 300 may continue by classifying the documents of $T_1$ (which may be either the original set or the refined set, e.g., the document set $P_0$ or the document set $P_0+P_1$) by structured fields, annotations, or other taxonomies. In other words a second classification or categorization—additional to that of taxonomy $T_1$—may be made of the documents of $T_1$. For example, to link topics with manufacturers, i.e., companies in the illustrative example, a user of system 100 may use analytics tools 104 to build a second taxonomy $T_2$ based either on structured fields of the documents of $T_1$ or on annotations. If the classification is based on a structured field then process 304 may use the URL of the web page to determine the domain name where the web page was originally stored. Another way to make a second classification may be to extract company names using a name-annotation step over the document set of $T_1$ to extract names out of the documents. In either case the result may be a new taxonomy $T_2$ based on companies. The second taxonomy $T_2$ can then be compared to the original taxonomy $T_1$ (shown in FIG. 4) by creating a contingency table, such as contingency table 500 shown in FIG. 5.

Method 300 may continue at process 305 by using contingency analysis to generate a contingency table $C_0$ that compares the refined taxonomy $T_1$ and the second classification based on process 304. The contingency table $C_0$—such as contingency table 500 illustrated in FIG. 5—may display a first set of categories (e.g., the companies or automakers of the example) across one axis (e.g., horizontal axis 501 so that each column of the table 500 corresponds to an automaker) and the second set of categories or classifications along the other axis (e.g., vertical axis 502 so that each row of the table 500 corresponds to one of the classifications listed in the "Class" column of table 500). The cells (e.g., cell 503) may indicate the number of documents that occur at the intersection of the first and second classifications, e.g., automaker vs. class of the "Class" column. Each cell—such as cell 503—may have an expected value which can be calculated based on the size 507 of the second category—such as category 504, "fuel economy" for cell 503, and having size 507 equal to 691 in the example—and the total number of documents for the cell, which may also depend on the first (e.g., "automaker") category for the cell—such as category 505 for cell 503, having the particular value of "honda" in the illustrated example.

For example, an expected value percentage for each cell may be calculated as (percent of the class's documents out of the total number for the class)×(percent of the documents in the class out of the total number of documents in all classes). If the expected value is exceeded by the actual value in the cell, then the cell may be shaded. For example, cell 503 is illustrated with a moderate shading that matches moderate affinity shading 508. The degree of shading may indicate the degree of significance of the cell's value, which may be calculated, for example, using a statistical test, such as the well-known chi-squared test (see Press, et al., "Numerical Recipes in C, second edition", New York, Cambridge University Press, (1992), pages 620-623). Shading of each cell may indicate a significant relationship between the class (second category) corresponding to the cell and the first—or horizontal axis—category corresponding to the cell, and the degree of shading may indicate the degree of significance of the relationship. For example, the moderate affinity shading of cell 503 may indicate a moderate degree (as compared to "very high" 509, "low" 510, and "no" 511 degrees of affinity illustrated in FIG. 5) of significance between class 504 (e.g., "fuel economy") and category 505 (e.g., "honda") of cell 503. Each cell may also contain a checkbox, which may be checked—as shown for cell 503—for any desired special purpose, such as to draw specific attention to the particular cell.

Method 300 may continue at process 306 by finding significant relationships using contingency tables $C_0$. For example, looking at typical examples within each category along axis 501 (first category) of contingency table $C_0$ 500, process 306 may produce the following observations:

1. Honda and Toyota are the most frequently discussed, with GM following.
2. VW was the least frequently discussed.
3. Discussion seems to center around sales of Honda and Toyota models.
4. Honda discussions are highly associated with the topic of fuel economy.

5. New models and future plans were the frequent topics when GM was discussed.

6. Web content that discussed HEV's and SUV's frequently mentioned Ford.

Method 300 may continue at process 307 by overlaying trending information on top of document taxonomy $T_1$, and contingency tables $C_0$. For example, FIG. 4 shows trending information 403 overlaid on a taxonomy $T_1$. Trending information—such as trending information 403—may be added to each cell of a contingency table $C_0$. For example, each cell (e.g., cell 503) of contingency table 500 may contain trending information in graphical form, which may be similar in description to that given above for trending information 403. In the illustrative example given, the trend lines in each cell of contingency table 500 may be based on the structured information relating to the date of each web page from the document set $P_0$. The structured information relating to the date of each web page may then be converted into a trend graph showing how the contents of each cell tracks over time. Such trend graphs may help reveal recent categories, e.g., a category with a majority of documents published subsequent to some pre-determined date—such as within the past month.

Method 300 may continue at process 308 by identifying recent and most related categories (for example, first categories most related to second categories) using, for example, contingency table 500. "Recent" may defined as desired—for example, as more recent than 5 years, more recent than 1 year, more recent than 3 months, or the like. Similarly, "most related" may be defined as deemed appropriate, using the distance of nearest neighbor methodologies, for example, cosine distance in the feature space, as a measure of most closely related; or, for example, using a statistical correlation or likelihood value from the contingency table $C_0$ (e.g., contingency table 500) as a different measure of "most related".

In addition to identifying categories of interest (e.g., recent or most related), method 300 may also identify a document of interest in a particular category. For example, a document of interest might be one that typifies the category in the sense of being an "average" document. Such an average may be defined, for example, as a centroid of the category using the distance of a nearest neighbor methodology, e.g., cosine distance in the feature space. There may not actually be a "typical" or "average" document that matches the centroid, so the document of interest may be identified, for example, as the document closest to the centroid in the feature space. As an alternative example, the documents of interest may be identified as any documents within a pre-specified distance of the centroid in the feature space. Such a criterion may provide a mathematical definition of the category, and the document of interest may be said to be the document that most nearly matches the mathematical definition of the category. In the same sense, a document of interest may be said to be a document that fits the category model well, or that is a "typical" document within the category, i.e., representative of documents within the category.

At process 309, method 300 may repeat processes 304-308 by using different structured fields, features, or other information to compare the document sets in various ways. In other words, by iterating processes 304-308, multiple comparisons between all the different categories and between different types of categories (e.g., first categories and second categories) may be obtained.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A method executed by a computer processor and stored on a computer readable medium for use with a first set of documents related to a first topic of interest and a second set of documents related to a second topic of interest, the method comprising the steps of:

automatically generating a first taxonomy through a feature space derived from the first set of documents, wherein the feature space includes at least one of unstructured data, structured data, and annotations derived from text of the first set of documents, and the first taxonomy provides a first partition of the set of documents according to the taxonomy;

using domain-specific knowledge to re-partition the first set of documents to provide a second partition of the first set of documents;

creating a refined taxonomy for the first set of documents according to the second partition so that the refined taxonomy incorporates the domain specific knowledge;

using the refined taxonomy to categorize the first e of documents into a first set of categories;

creating a second set of categories of the first set of documents, wherein the second set of categories are independent of the second partition based on at least one of unstructured data, structured data, and annotations derived from text in the first set of documents;

constructing a contingency table having the first set of categories along a first axis and the second set of categories along a second axis, wherein the contingency table includes cells having respective actual values and for which respective expected values are computed, and the contingency table includes a cell having trending information;

displaying the first set of categories along a first axis and the second set of categories along a second axis on a display device;

comparing the expected value against the actual value of a cell to identify a category of interest;

computing a degree of significance for the actual value of the cell;

identifying a relationship between at least two different categories using the contingency table;

using the contingency table and trending information to identify a recent category with respect to some predetermined date;

using an element of domain knowledge to re-categorize the first set of documents;

categorizing the second set of documents according to the first set of categories of the first set of documents, further including categorizing the second set of documents according to a criterion chosen from the group consisting of: text within the second set of documents, structure within the second set of documents, and annotations derived from text within the second set of documents;

examining the first set of categories to identify correlations between categories; and examining a category of the first set of categories to identify a document of interest, the document of interest being a representative document within the category.

2. A method executed by a computer processor for use with a first set of documents related to a first topic of interest and a second set of documents related to a second topic of interest, comprising:

automatically generating a first taxonomy through a feature space derived from the first set of documents, wherein the feature space includes at least one of unstructured data, structured data, and annotations derived from text of the first set of documents, and the first taxonomy provides a first partition of the first set of documents according to the first taxonomy;

using domain-specific knowledge to re-partition the first set of documents to provide a second partition of the first set of documents;

using a first taxonomy to categorize the first set of documents into a first set of categories;

creating a second set of categories of the first set of documents, wherein the second set of categories are independent of the second partition based on at least one of unstructured data, structured data, and annotations derived from text in the first set of documents;

constructing a contingency table having the first set of categories along a first axis and the second set of categories along a second axis, wherein the contingency table includes cells having respective actual values and for which respective expected values are computed, and includes a cell having trending information;

displaying the first set of categories along a first axis and the second set of categories along a second axis on a display device;

comparing the expected value of a cell against the actual value of a cell to identify a category of interest;

computing a degree of significance for the actual value of the cell;

identifying a relationship between at least two different categories using the contingency table;

using the contingency table and trending information to identify a recent category with respect to some predetermined date;

comparing the category of interest with the first taxonomy over time;

categorizing the second set of documents according to the set of categories of the first set of documents;

examining a category to identify a document of interest, the document of interest being identified as a document within a pre-specified distance of the centroid of a feature space derived from the first set of documents;

creating a second taxonomy different from and independent of the first taxonomy; and combining the first taxonomy with the second taxonomy by merging classes in the first taxonomy with classes in the second taxonomy.

3. The method of claim 2, including using an element of domain knowledge to re-categorize the first set of documents.

4. The method of claim 2, wherein categorizing the second set of documents includes categorizing the second set of documents according to a criterion chosen from a group consisting of: text within the second set of documents, structure within the second set of documents, and annotations derived from text within the second set of documents.

5. The method of claim 2, including examining a set of mutually different categories to identify correlations between categories.

6. A method executed by a computer processor for use with a set of documents related to a first topic of interest, comprising:

automatically generating a first taxonomy through a feature space derived from the set of documents, wherein the feature space includes at least one of unstructured data, structured data, and annotations derived from text of the set of documents, and the first taxonomy provides a first partition of the set of documents according to the first taxonomy;

using domain-specific knowledge to re-partition the set of documents to provide a second partition of the set of documents;

using a first taxonomy to categorize the set of documents into a first set of categories:

creating a second set of categories of the first set of documents, wherein the second set of categories are independent of the second partition based on at least one of unstructured data, structured data, and annotations derived from text in the first set of documents;

constructing a contingency table having the first set of categories along a first axis and the second set of categories along a second axis, each category of the second set of categories being associated with a plurality of categories of the first set of categories, wherein the contingency table includes cells having respective actual values and for which respective expected values are computed, and includes a cell having trending information;

displaying the first set of categories along a first axis and the second set of categories along a second axis on a display device;

comparing the expected value of a cell against the actual value of a cell to identify a category of interest;

computing a degree of significance for the actual value of the cell;

using the contingency table and trending information to identify a recent category with respect to some predetermined date;

comparing each category in the first set of categories with each category in the second set of categories;

identifying a relationship between at least two different categories using the contingency table;

creating a second taxonomy different from and independent of the first taxonomy; and combining the first taxonomy with the second taxonomy by merging classes in the first taxonomy with classes in the second taxonomy.

7. A method executed by a computer processor, comprising:

extracting a set of documents related to a specified topic from a data warehouse;

automatically generating a first taxonomy through a feature space derived from the set of documents, wherein the feature space includes at least one of unstructured data; structured data, and annotations derived from text of the set of documents, and the first taxonomy provides a first partition of the set of documents according to the first taxonomy;

using domain-specific knowledge to re-partition the set of documents to provide a second partition of the set of documents;

using a first taxonomy to categorize the set of documents into a first set of categories;

creating a second set of categories of the set of documents, wherein the second set of categories are independent of the second partition based on at least one of unstructured data, structured data, and annotations derived from text in the set of documents;

constructing a contingency table having the first set of categories along a first axis and the second set of categories along a second axis, wherein the contingency table includes cells having respective actual values and for which respective expected values are computed, and includes a cell having trending information;

displaying the first set of categories along a first axis and the second set of categories along a second axis on a display device;

comparing the expected value of a cell against the actual value of a cell to identify a category of interest;

computing a degree of significance for the actual value of the cell;

identifying a relationship between at least two different categories using the contingency table;

using the contingency table and trending information to identify a recent category with respect to some predetermined date;

creating a second taxonomy different from and independent of the first taxonomy for the set of documents according to the second partition so that the different second taxonomy incorporates the domain-specific knowledge;

comparing each of a plurality of categories in the first partition of the set of documents with each of a plurality of categories in the second partition of the set of documents; and combining the first taxonomy with the second taxonomy by merging classes in the first taxonomy with classes in the second taxonomy.

8. The method of claim 7, including:

classifying the set of documents into classification classes independent of the second partition; and generating a contingency table for comparing the categories of the different second taxonomy with the classification classes of the set of documents.

9. The method of claim 7, including:

classifying the set of documents according to at least one of structured fields, annotations, and a second taxonomy for the set of documents; and generating a contingency table for comparing the categories of the different second taxonomy with classification classes of the set of documents.

10. The method of claim 7, including:

classifying the set of documents into classes independent of the second partition;

generating a contingency table for comparing the categories of the different second taxonomy with the classes of the set of documents; and identifying a set of most closely-related categories using the contingency table.

11. The method of claim 7, including:

classifying the set of documents into classes independent of the second partition;

generating a contingency table for comparing the categories of the different second taxonomy with the classes of the set of documents; and identifying a set of mutually different recent categories using the contingency table.

12. The method of claim 7, including:

classifying the set of documents into a first set of classes independent of the second partition;

generating a first contingency table for comparing the mutually different categories of the different second taxonomy with the first classes of the set of documents;

classifying the set of documents into a second set of classes independent of the second partition; and generating a second contingency table for comparing the categories of the different second taxonomy with the second classes of the set of documents.

13. A computer program product for use with a first set of documents related to a first topic of interest and a second set of documents related to a second topic of interest, the computer program product comprising a non-transitory computer-readable storage medium including a computer readable program, wherein the computer readable program when executed on a computer causes the computer to:

automatically generate a first taxonomy through a feature space derived from the first set of documents, wherein the feature space includes at least one of unstructured data, structured data, and annotations derived from text of the first set of documents, and the first taxonomy provides a first partition of the first set of documents according to the first taxonomy;

use domain-specific knowledge to re-partition the first set of documents to provide a second partition of the first set of documents;

use a first taxonomy to categorize the first set of documents into a first set of categories;

create a second set of categories of the first set of documents, wherein the second set of categories are independent of the second partition based on at least one of unstructured data, structured data, and annotations derived from text in the first set of documents;

construct a contingency table having the first set of categories along a first axis and the second set of categories along a second axis, wherein the contingency table includes cells having respective actual values and for which respective expected values are computed, and includes a cell having trending information;

display the first set of categories along a first axis and the second set of categories along a second axis on a display device;
compare the expected value of a cell against the actual value of a cell to identify a category of interest;
compute a degree of significance for the actual value of the cell;
identify a relationship between at least two different categories using the contingency table;
use the contingency table and trending information to identify a recent category with respect to some pre-determined date;
categorize the second set of documents according to the set of categories of the first set of documents;
compare each of the set of categories in the first set of documents with each of the set of categories in the second set of documents;
examine a category to identify a document of interest, wherein the document of interest typifies the category by being within a pre-specified distance of a centroid of a mathematical definition of the category;
create a second taxonomy different from and independent of the first taxonomy; and
combine the first taxonomy with the second taxonomy by merging classes in the first taxonomy with classes in the second taxonomy.

14. A computer program product stored on a non-transitory computer readable storage medium, the computer program product including a computer readable program, wherein the computer readable program when executed on a computer causes the computer to:
extract a set of documents related to a specified topic from a data warehouse;
automatically generate a first taxonomy through a feature space derived from the set of documents, wherein the feature space includes at least one of unstructured data, structured data, and annotations derived from text of the set of documents, and the first taxonomy provides a first partition of the set of documents according to the first taxonomy;
use domain-specific knowledge to re-partition the set of documents to provide a second partition of the set of documents;
use a first taxonomy to categorize the set of documents into a first set of categories;
create a second set of categories of the set of documents, wherein the second set of categories are independent of the second partition based on at least one of unstructured data, structured data, and annotations derived from text in the set of documents;
construct a contingency table having the first set of categories along a first axis and the second set of categories along a second axis, wherein the contingency table includes
 cells having respective actual values and for which respective expected values are computed, and
 a cell having trending information;
display the first set of categories along a first axis and the second set of categories along a second axis on a display device;
compare the expected value of a cell against the actual value of a cell to identify a category of interest;
compute a degree of significance for the actual value of the cell;
identify a relationship between at least two different categories using the contingency table;
use the contingency table and trending information to identify a recent category with respect to some pre-determined date;
compare the specified topic with the first taxonomy over time;
create a second taxonomy different from and independent of the first taxonomy for the same set of documents according to the second partition so that the different second taxonomy incorporates the domain-specific knowledge; and
combine the first taxonomy with the second taxonomy by merging classes in the first taxonomy with classes in the second taxonomy.

* * * * *